United States Patent
Haney et al.

(10) Patent No.: US 10,961,941 B1
(45) Date of Patent: Mar. 30, 2021

(54) PHYSICS-BASED CHARGE TEMPERATURE MODEL

(71) Applicant: GM Global Technology Operations LLC, Detroit, MI (US)

(72) Inventors: Wesley R. Haney, Holly, MI (US); Layne K. Wiggins, Dexter, MI (US); Shawn W. Murphy, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/807,951

(22) Filed: Mar. 3, 2020

(51) Int. Cl.
*F02D 41/00* (2006.01)
*F02D 41/02* (2006.01)
*F02D 41/26* (2006.01)
*F02B 29/04* (2006.01)

(52) U.S. Cl.
CPC .......... *F02D 41/26* (2013.01); *F02B 29/0493* (2013.01); *F02D 41/0002* (2013.01); *F02D 2200/021* (2013.01); *F02D 2200/0402* (2013.01); *F02D 2200/0414* (2013.01); *F02D 2200/101* (2013.01)

(58) Field of Classification Search
CPC ..... Y02T 10/40; F02D 41/0087; F02D 37/02; F02D 41/021; F02D 41/126; F02D 2200/021; F02D 41/0085; F02D 19/088; F02D 2200/0402
See application file for complete search history.

(56) References Cited

U.S. PATENT DOCUMENTS

| | | | | |
|---|---|---|---|---|
| 2003/0192495 A1* | 10/2003 | Hagner | ...................... | F01L 1/34 123/90.17 |
| 2003/0236610 A1* | 12/2003 | Cullen | ...................... | F01L 1/34 701/103 |
| 2008/0066715 A1* | 3/2008 | Jankovic | ............. | F02D 13/0226 123/302 |
| 2010/0318279 A1* | 12/2010 | Meyer | ................... | F02D 41/045 701/103 |
| 2013/0218441 A1* | 8/2013 | Thomas | .............. | F02D 41/0002 701/105 |
| 2016/0326978 A1* | 11/2016 | Solomon | ............... | F01N 3/2066 |
| 2018/0320626 A1* | 11/2018 | Surnilla | ..................... | F01N 3/36 |

* cited by examiner

*Primary Examiner* — Long T Tran

(57) ABSTRACT

A physics-based charge temperature model to calculate a charge air temperature for an automobile vehicle includes multiple variables. The multiple variables include: a first variable defining an engine speed of an engine defining revolutions per minute of a crankshaft of the engine; a second variable defining a cam position; a third variable defining an engine coolant temperature; a fourth variable defining an air intake temperature; a fifth variable defining an engine air flow; and a sixth variable defining a firing fraction of the engine. A controller provides multiple lookup tables. The controller controls operation of the engine using the multiple variables and data in the multiple lookup tables to calculate a charge air temperature for individual intake strokes of at least one cylinder of the engine.

19 Claims, 3 Drawing Sheets

PHYSICS-BASED CHARGE TEMPERATURE MODEL

INTRODUCTION

The present disclosure relates to prediction of engine air charge temperature for an automobile vehicle engine.

Automobile vehicle engines may be controlled using an estimated charge air temperature and a measured mass of air entering a cylinder to calculate a volume of fuel to be added for individual intake strokes, as well as to adjust engine timing. Direct temperature measurement within a piston chamber is not available therefore charge air temperature estimates are made using algorithms. Present algorithms used to estimate the charge air temperature rely on variables including an air intake temperature, an engine mass airflow, a vehicle speed and a coolant temperature which is used to estimate heat transferred to the charge air volume. It has been found that vehicle speed has minimal impact on newer aerodynamically designed automobile vehicles because air flow through the engine bay due in part to engine and component size increases within available space of the engine bay, and application of aero-shutters within the engine bay combine to limit air flow. Air flow through the engine bay therefore does not vary substantially with vehicle speed.

In addition, present algorithms do not accurately account for exhaust gas mixing that occurs at engine intake ports which may increase the average charge air temperature. Present algorithms also do not accurately account for multiple different engine operating states including cylinder deactivation events, or cam shaft position changes available using cam phasers.

Thus, while current automobile vehicle charge air temperature estimation algorithms achieve their intended purpose, there is a need for a new and improved system and method for estimating charge air temperature.

SUMMARY

According to several aspects, a physics-based charge temperature model to calculate a charge air temperature for an automobile vehicle includes multiple variables, including: an engine speed; a cam position; and a firing fraction of an engine. A controller controls operation of the engine and uses the multiple variables to calculate a charge air temperature for individual intake strokes of at least one cylinder of an automobile engine.

In another aspect of the present disclosure, the multiple variables include an engine coolant temperature measured using a coolant temperature sensor.

In another aspect of the present disclosure, the multiple variables include an air intake temperature measured using a temperature sensor at an entrance to a cylinder intake line.

In another aspect of the present disclosure, the multiple variables include an engine air flow measured in grams per second using a mass air flow (MAF) sensor.

In another aspect of the present disclosure, the at least one cylinder includes multiple cylinders, and wherein the firing fraction of the engine defines an average quantity of the multiple cylinders which fire during individual engine cycles.

In another aspect of the present disclosure, a total port flow is determined equaling the engine air flow divided by the firing fraction.

In another aspect of the present disclosure, the engine coolant temperature and the air intake temperature are applied to determine a delta coolant charge, wherein the delta coolant charge is equal to the engine coolant temperature minus the air intake temperature.

In another aspect of the present disclosure, the multiple variables include an air intake temperature measured using a temperature sensor at a discharge from an intercooler.

In another aspect of the present disclosure, the engine speed and the cam position are entered into a lookup table to determine an amount of heated cylinder gas mixing influencing heat transfer to an air intake temperature.

In another aspect of the present disclosure, an output from the lookup table defines a Cylinder Gas Influence (CGI), and wherein if engine scavenging is present the CGI is set to one (1), else a value of the CGI is determined from the lookup table.

According to several aspects, a physics-based charge temperature model to calculate a charge air temperature for an automobile vehicle includes multiple variables. A first variable defines an engine speed of an engine defining revolutions per minute of a crankshaft of the engine. A second variable defines a cam position in relationship to the crankshaft position. A third variable defines an engine coolant temperature. A fourth variable defines an air intake temperature. A fifth variable defines an engine air flow. A sixth variable defines a firing fraction of the engine. A controller has multiple lookup tables. The controller controls operation of the engine uses the multiple variables and data in the multiple lookup tables to calculate a charge air temperature for individual intake strokes of at least one cylinder of the engine.

In another aspect of the present disclosure, the controller applies the firing fraction to estimate an airflow used to determine a heat transfer from the engine.

In another aspect of the present disclosure, the engine speed and the cam position when entered into a first one of the multiple lookup tables identify if engine cylinder gas backflow into an intake line is present and influencing heat transferred to the air intake line affecting the air intake temperature.

In another aspect of the present disclosure, a delta temperature influence is derived from a second one of the multiple lookup tables.

In another aspect of the present disclosure, the delta temperature influence defines heat transferred to a charge air volume individually from an engine coolant based on the engine coolant temperature, from an intake air volume influenced by the air intake temperature, from the engine influenced by the engine airflow and from the firing fraction.

In another aspect of the present disclosure, a delta coolant charge is defined by the engine coolant temperature and the air intake temperature.

In another aspect of the present disclosure, the delta coolant charge is equal to the engine coolant temperature minus the air intake temperature.

According to several aspects, a method for operating a physics-based charge temperature model to calculate a charge air temperature for an automobile vehicle includes: obtaining multiple variables, including: measuring a first variable defining an engine speed of an engine defining revolutions per minute of a crankshaft of the engine; identifying a cam position as a second variable; sensing an engine coolant temperature as a third variable; defining an air intake temperature provided by a temperature sensor as a fourth variable; receiving data from a mass air flow sensor identifying an engine air flow as a fifth variable; and determining a firing fraction of the engine as a sixth variable; and controlling operation of the engine using a controller having multiple lookup tables, the controller applying the multiple variables and data in the multiple lookup tables and calculating a charge air temperature for individual intake strokes of at least one cylinder of the engine.

In another aspect of the present disclosure, the method further includes calculating a delta coolant charge equal to the engine coolant temperature minus the air intake temperature.

In another aspect of the present disclosure, the method further includes: entering the engine speed and the cam position into a first one of the multiple lookup tables to identify if an engine cylinder backflow into an intake line condition is present and is influencing heat transfer to the air intake temperature; and deriving a delta temperature influence from a second one of the multiple lookup tables.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
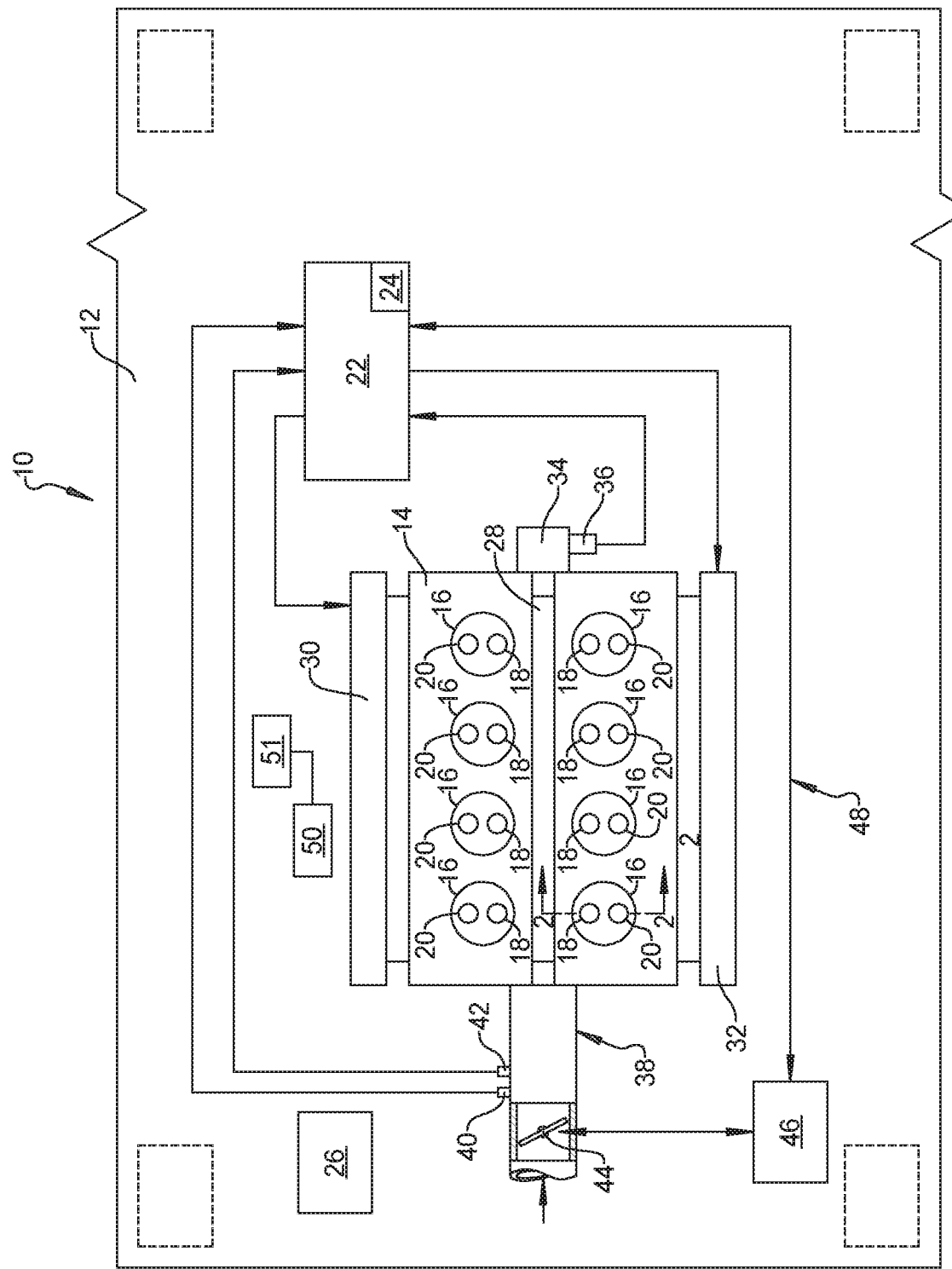
FIG. 1 is a diagrammatic presentation of a physics-based charge temperature model for use in an automobile vehicle according to an exemplary aspect.

Referring to FIG. 1, a physics-based charge temperature system and operating method, hereinafter referred to as a physics-based charge temperature model 10 is provided in an automobile vehicle 12. The automobile vehicle 12 includes an engine 14 having multiple cylinders 16. In the example shown eight cylinders 16 are identified, however the engine 14 can include any quantity of cylinders 16 including but not limited to 2, 4, 6, 8, or 10 cylinders. The cylinders 16 individually include at least one intake valve 18 directing charge air into the cylinder 16, and at least one exhaust valve 20 directing exhaust gases outward from the cylinder 16. Engine operational control is provided using at least one controller or processor hereinafter referred to collectively as a powertrain or engine controller 22. The controller 22 can be any type of device capable of processing electronic instructions including microprocessors, microcontrollers, host processors, vehicle communication processors, and application specific integrated circuits (ASICs).

The controller 22 can be a dedicated controller or processor used for engine control or can be shared with other vehicle systems. The controller 22 executes various types of digitally stored instructions, such as software, lookup tables or firmware programs stored in a memory 24 which may save multiple pre-populated lookup tables, the instructions enabling the controller 22 to provide a wide variety of services. For example, the controller 22 can execute programs and process data to carry out at least a part of the method discussed herein and may communicate with other devices such as a transmission controller 26 and control an engine output torque. At least one camshaft 28 is also provided to actuate the at least one intake valve 18 and the at least one exhaust valve 20.

In the diagrammatic presentation of FIG. 1, the engine 14 defines an internal combustion engine having fuel injectors 30 controlling flow of a fuel and spark plugs 32 controlled by the engine controller 22. The engine 14 includes a crankshaft 34 whose speed and position are detected by a speed and position detector 36 that generates a signal such as a pulse train to the engine controller 22. The engine 14 may comprise a gasoline internal combustion engine, or any other internal combustion engine known in the art. An intake manifold 38 provides air to the cylinders 16. The at least one intake valve 18 and the at least one exhaust valve 20 are coupled to the camshaft 28 and may be used in an overhead valve or overhead cam configuration that may be physically coupled and decoupled to the at least one intake valve 18 and the at least one exhaust valve 20 to shut off air and fuel flow through the cylinders 16. An air flow sensor 40 and a manifold air pressure (MAP) sensor 42 may be used to detect an air flow in an air intake line and an air pressure within the intake manifold 38 and generate signals to the engine controller 22.

An electronic throttle 44 having a throttle plate controlled by an electronic throttle controller 46 may be used which receives signals from the engine controller 22 to control a mass of air entering the intake manifold 38. The electronic throttle controller 46 may include power circuitry to modulate the electronic throttle 44 and circuitry to receive position and commanded speed input from the electronic throttle 44. The electronic throttle controller 46 may further include communication circuitry such as a serial link or automotive communication network interface to communicate with a powertrain controller (not shown) over an automotive communications network 48.

According to several aspects the engine 14 may be an aspirated engine or may be a turbocharged engine having a turbocharger 50 or may be a supercharged engine having a supercharger to boost intake air pressure for charge air supply. The supercharger or turbocharger 50 may be connected to an intercooler 51 to precool the boosted charge air supply.

Referring to FIG. 2 and again to FIG. 1, an individual cylinder 16 is shown. The intake valve 18 directs charge air and fuel as a mixture via an intake line 52 into a combustion chamber 54 above a piston 56 in the cylinder 16. According to further aspects, the fuel may be directly injected into the combustion chamber 54 independently of the charge air. The exhaust valve 20 directs exhaust gases outward from the cylinder 16 via an exhaust passage 58. A spark plug 60, controlled also by the engine controller 22, is used to enhance the ignition timing control of the engine 14 across an engine load range. Control of the motion of the intake valve 18 and exhaust valve 20 is provided for a four-stroke cycle using a cam-actuated valve system. In the figure, the exhaust valve 20 is opened during rotation of the crankshaft 34, i.e. defining one engine cycle.

During a first period of opening or exhaust stroke, the intake valve 18 is closed, the exhaust valve 20 is opened and combusted gases are expelled from the combustion chamber 54 to the exhaust passage 58. During a second period of opening or intake stroke, the exhaust valve 20 is closed, the intake valve 18 is opened and a fuel/air charge is drawn into the combustion chamber 54 through the intake line 52. During a third period the intake valve 18 is directed to close and a compression stroke is then performed. An ignition of the fuel/air charge occurs after compression of the fuel/air charge during the compression stroke. During a fourth period the combustion of the fuel/air charge mixture then causes the gases to expand in a power stroke. The four-stroke cycle then starts again. As known, the timing of opening and closing of the intake valve 18 and the exhaust valve 20 can be varied to open or close earlier or later as discussed below.

As previously noted, the valve train is tied to the position of the engine 14, which is measured by the speed and position detector 36. The speed and position detector 36 is connected to the crankshaft 34, which is connected by a connecting rod 62 to the piston 56 to reciprocate the piston 56 in the cylinder 16.

Figure 2:
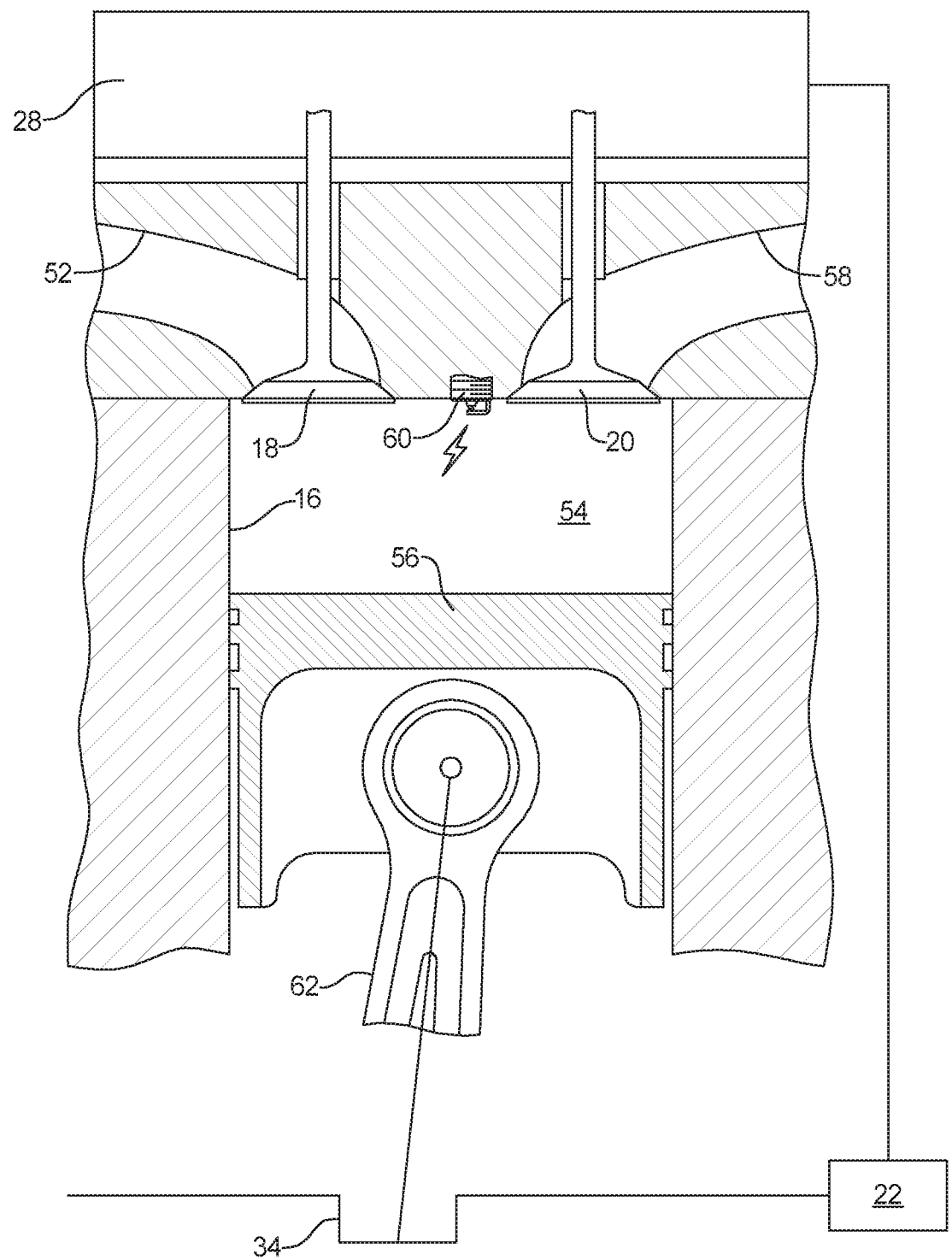
FIG. 2 is a cross sectional elevational view taken at section 2 of FIG. 1.
Figure 3:
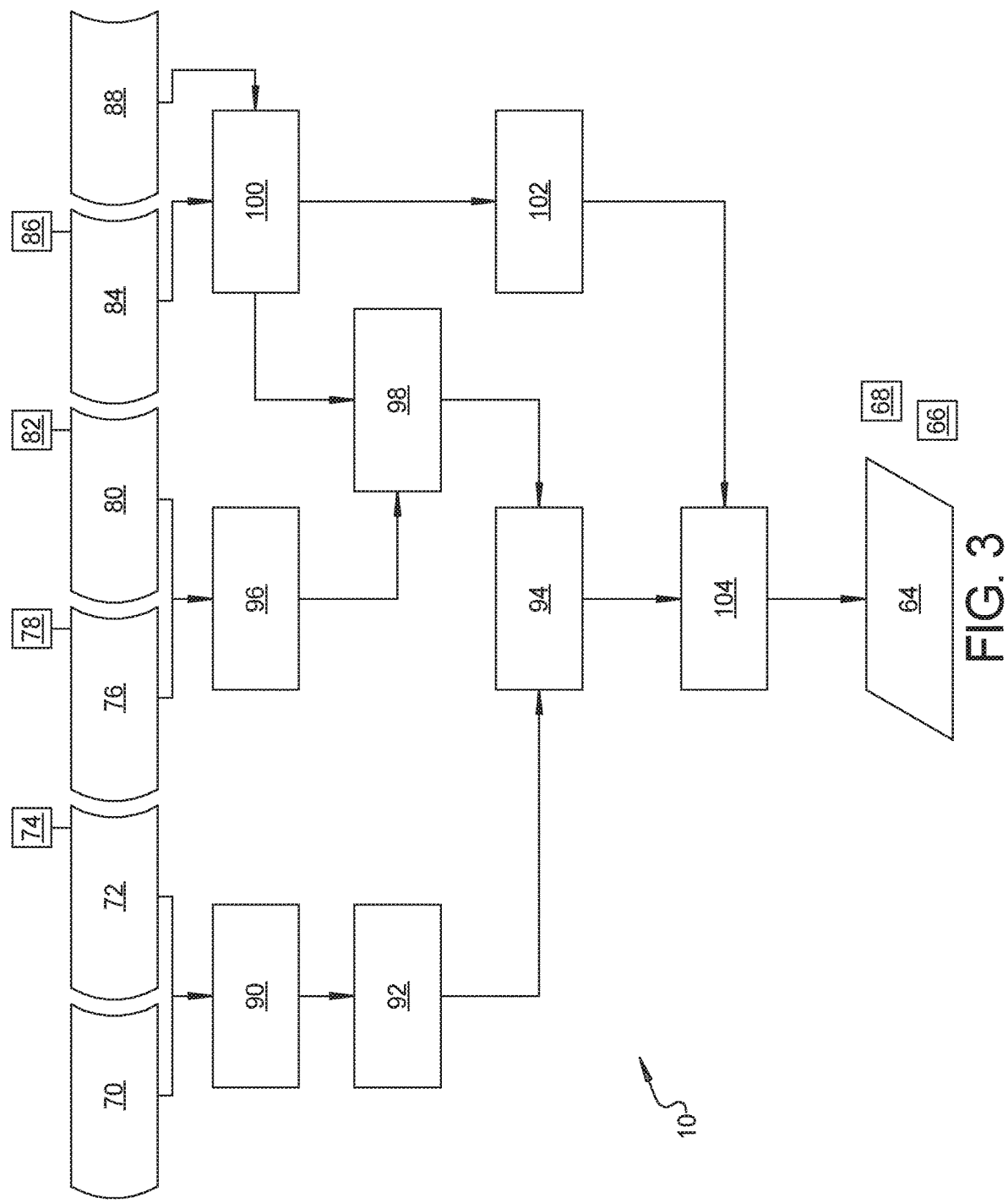
FIG. 3 is a flow diagram of method steps for using the physics-based charge temperature model of FIG. 1

Referring to FIG. 3 and again to FIGS. 1 and 2, according to several aspects, the physics-based charge temperature model 10 provides an estimate of an automobile vehicle charge air temperature 64. The charge air temperature 64 is calculated by the engine controller 22 and is used by the engine controller 22 to calculate a fuel volume 66 to be added to the intake line 52 together with an estimated charge air mass 68 for individual intake strokes of the cylinders 16. The physics-based charge temperature model 10 includes multiple variables. A first variable defines an engine speed 70 measured in engine crankshaft revolutions per minute (rpm). The engine speed 70 can be a temperature corrected value. The engine speed 70 is used to estimate a volume of air backflow occurring from a cylinder 16 into the intake line 52 of the engine intake manifold, as this heated volume of air will preheat or influence the temperature of the intake or charge air thereafter entering the cylinder 16. At lower engine rpm, for example below approximately 1400 rpm, the volume of air backflow is increased compared to a volume of air backflow occurring at increased engine rpm, for example above 1400 rpm, due at lower engine rpm to an increased available time for charge air to travel through the system.

A second variable defines a cam position 72 which can be a cam position identified using a cam phaser 74 as is known. A third variable defines an engine coolant temperature 76 measured for example using a coolant temperature sensor 78. The engine coolant temperature 76 determines a cylinder head temperature which influences a temperature of the air passing through the cylinder head and therefore determines the temperature of the intake line 52. The physics-based charge temperature model 10 also accounts for engine startup conditions when the cylinder head is at or approximates atmospheric temperature prior to engine heatup wherein the engine coolant temperature 76 is therefore at or approximately at atmospheric temperature.

A fourth variable of the physics-based charge temperature model 10 defines an air intake temperature 80 measured for example using a temperature sensor 82. A location where the air intake temperature 80 is determined can vary. For example, the air intake temperature 80 in a normally aspirated engine may be determined at an entrance to the intake line 52 described in reference to FIG. 2, wherein the air intake temperature 80 in a turbocharged or boosted engine having the turbocharger 50 described in reference to FIG. 1 may be determined at a discharge from the intercooler 51.

A fifth variable of the physics-based charge temperature model 10 defines an engine air flow 84 or an air mass flow rate entering the engine intake manifold 38. The engine air flow 84 may be measured for example in grams per second using a mass air flow (MAF) sensor 86, similar to the air flow sensor 40 described in reference to FIG. 1, which may be positioned proximate to the intake line 52 in a normally aspirated engine.

A sixth variable of the physics-based charge temperature model 10 defines a firing fraction 88 identifying an average quantity of the cylinders 16 which fire during individual engine cycles. In an exemplary eight-cylinder engine the firing fraction is 1.0 if all eight cylinders fire during each engine cycle and is 0.5 if only four of the eight cylinders fire. A quantity between 1.0 and 0.5 may therefore be applied when the average quantity of firing cylinders is changing between 8 and 4 over two or more engine cycles.

The engine speed 70 and the cam position 72 which may define a cam phaser degree are applied following reference to a first lookup table 90 to identify a magnitude of the influence from the heated cylinder gas that is mixed in the intake path 52. Engine scavenging or an engine scavenging condition occurs primarily in boosted or turbo-charged engines due to increased inlet air pressure. During certain boosted engine operations, the intake valve 18 and the exhaust valve 20 may be simultaneously opened, which allows air passage through the combustion chamber 54 without combustion occurring. This process allows unburned gas from a previous cycle to be purged, allowing a new, fresh charge air volume and fuel volume to be injected and combusted, for example to maximize an open throttle launch. An output from the first lookup table 90 defines a value of a Cylinder Gas Influence (CGI) 92 which may be applied as a Boolean (zero or one) value. For example if engine scavenging is present a value of the CGI 92 is set to one (1), else the value of the CGI 92 remains at a value determined in the first lookup table 90.

The value of the CGI 92 is one of several values entered into an algorithm 94. The algorithm 94 determines a Steady State Charge Air Temperature and may be expressed in an Equation 1 as follows:

Charge Temp(degrees Kelvin)Steady State=(delta[Δ] coolant charge 96×ΔTemp Influence 98+Air Intake Temp 80)×(CGI)92      Equation 1

In above Equation 1 the A coolant charge 96 is determined by an Equation 2 as follows:

A coolant charge 96=Coolant Temp 76−Air Intake Temp 80      Equation 2

The above determined Δ coolant charge 96 is one of four variables which are used to calculate the Δ Temp Influence 98. The Δ Temp Influence 98 is derived from a second lookup table and identifies how much heat is being transferred to the charge air volume from the engine coolant based on the engine coolant temperature 76, from the intake air influenced by the air intake temperature 80, from the engine 14 influenced by the engine airflow 84 and as an impact of the firing fraction 88. The Δ Temp Influence 98 is determined by entering the second lookup table with values of the Δ coolant charge 96 and a Total Port Flow 100.

The Total Port Flow 100 is calculated using an Equation 3 as follows:

Total Port Flow 100=Engine Air Flow 84÷Firing Fraction 88      Equation 3:

In parallel with the determination of the Δ Temp Influence 98 the Total Port Flow 100 calculated above is also entered into a third lookup table defining a Charge Temperature Filter lookup table 102. An output including the Steady State Charge Air Temperature and an output from the Charge Temperature Filter lookup table 102 are entered into a first order Lag Filter 104. A coefficient of the Lag Filter 104 may vary based on engine airflow 84 which impacts the output of the Charge Temperature Filter lookup table 102 to modify the value of the automobile vehicle charge air temperature 64. The automobile vehicle charge air temperature 64 is repeatedly calculated during vehicle operation by the controller 22, for example once every one hundred (100) msec.

The physics-based charge temperature model 10 uses a physics model to predict an automobile vehicle charge air temperature by: 1) using a difference between an engine coolant temperature and an intake air temperature as one of the inputs to a heat transfer coefficient lookup; 2) multiplying a predicted airflow by a firing fraction to get an appropriate flow value which varies according to how many cylinders are actively firing; 3) using engine RPM and an intake cam phaser degree to determine an amount of backflow of hot cylinder gas that is present in an intake line which thereby influences intake air temperature; 4) the physics-based charge temperature model 10 accounts for an influence of scavenging on charge air temperature and exhaust residual backflow; and 5) the physics-based charge temperature model 10 applies the engine coolant temperature multiplied by a heat transfer coefficient as an offset to intake air temperature (IAT).

A physics-based charge temperature model 10 of the present disclosure offers several advantages. These include use of a firing fraction to determine a relevant airflow for an algorithm to use in determining heat transfer from a manifold/port wall. The physics-based charge temperature model 10 accounts for scavenging in turbocharged applications. Engine RPM and Intake Cam phaser degree are also used in table lookups to multiply a base charge temperature prediction, which allows a calibrator to account for exhaust residual being pushed into the intake line during late intake valve closing (LIVC) operation. Base temperature increases are also applied as an offset to the IAT based on physics modeling.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A physics-based charge temperature model to calculate a charge air temperature for an automobile vehicle, comprising:
   multiple variables, including:
   an engine speed;
   a cam position; and
   a firing fraction of an engine; and
   a controller controlling operation of the engine and using the multiple variables to calculate a charge air temperature for individual intake strokes of at least one cylinder of an engine of an automobile vehicle; and
   wherein the engine speed and the cam position are entered into a lookup table to determine an amount of heated cylinder gas mixing present.

2. The physics-based charge temperature model to calculate the charge air temperature for the automobile vehicle of claim 1, wherein the multiple variables include an engine coolant temperature measured using a coolant temperature sensor.

3. The physics-based charge temperature model to calculate the charge air temperature for the automobile vehicle of claim 2, wherein the multiple variables include an air intake temperature measured using a temperature sensor at an entrance to a cylinder intake line.

4. The physics-based charge temperature model to calculate the charge air temperature for the automobile vehicle of claim 3, wherein the multiple variables include an engine air flow measured in grams per second using a mass air flow (MAF) sensor.

5. The physics-based charge temperature model to calculate the charge air temperature for the automobile vehicle of claim 4, wherein the at least one cylinder includes multiple cylinders, and wherein the firing fraction of the engine defines an average quantity of the multiple cylinders which fire during individual engine cycles.

6. The physics-based charge temperature model to calculate the charge air temperature for the automobile vehicle of claim 4, further including a total port flow equaling the engine air flow divided by the firing fraction.

7. The physics-based charge temperature model to calculate the charge air temperature for the automobile vehicle of claim 3, wherein the engine coolant temperature and the air intake temperature are applied to determine a delta coolant charge, wherein the delta coolant charge is equal to the engine coolant temperature minus the air intake temperature.

8. The physics-based charge temperature model to calculate the charge air temperature for the automobile vehicle of claim 3, wherein the multiple variables include an air intake temperature measured using a temperature sensor at a discharge from an intercooler.

9. The physics-based charge temperature model to calculate the charge air temperature for the automobile vehicle of claim 1, wherein an output from the lookup table defines a Cylinder Gas Influence (CGI), and wherein if engine scavenging is present the CGI is set to one (1), else a value of the CGI is determined from the lookup table.

10. A physics-based charge temperature model to calculate a charge air temperature for an automobile vehicle, comprising:
    multiple variables, including:
    a first variable defining an engine speed of an engine measured in revolutions per minute of a crankshaft of the engine;
    a second variable defining a cam position;
    a third variable defining an engine coolant temperature;
    a fourth variable defining an air intake temperature;
    a fifth variable defining an engine air flow; and
    a sixth variable defining a firing fraction of the engine; and
    a controller having multiple lookup tables, the controller controlling operation of the engine and using the multiple variables and data in the multiple lookup tables to calculate a charge air temperature for individual intake strokes of at least one cylinder of the engine.

11. The physics-based charge temperature model to calculate the charge air temperature for the automobile vehicle of claim 10, wherein the controller applies the firing fraction to estimate an airflow used to determine a heat transfer from the engine.

12. The physics-based charge temperature model to calculate the charge air temperature for the automobile vehicle of claim 10, wherein the engine speed and the cam position when entered into a first one of the multiple lookup tables identify if engine cylinder gas backflow into an intake line is present.

13. The physics-based charge temperature model to calculate the charge air temperature for the automobile vehicle of claim 10, further including a delta temperature influence derived from a second one of the multiple lookup tables.

14. The physics-based charge temperature model to calculate the charge air temperature for the automobile vehicle of claim 13, wherein the delta temperature influence defines heat transferred to a charge air volume individually from an engine coolant based on the engine coolant temperature, from an intake air volume influenced by the air intake temperature, from the engine influenced by the engine airflow and from the firing fraction.

15. The physics-based charge temperature model to calculate the charge air temperature for the automobile vehicle of claim 10, further including a delta coolant charge defined by the engine coolant temperature and the air intake temperature.

16. The physics-based charge temperature model to calculate the charge air temperature for the automobile vehicle of claim 15, wherein the delta coolant charge is equal to the engine coolant temperature minus the air intake temperature.

17. A method for operating a physics-based charge temperature model to calculate a charge air temperature for an automobile vehicle, comprising:

obtaining multiple variables, including:
- measuring a first variable defining an engine speed of an engine defining revolutions per minute of a crankshaft of the engine;
- identifying a cam position as a second variable;
- sensing an engine coolant temperature as a third variable;
- defining an air intake temperature provided by a temperature sensor as a fourth variable;
- receiving data from a mass air flow sensor identifying an engine air flow as a fifth variable; and
- determining a firing fraction of the engine as a sixth variable; and controlling operation of the engine using a controller having multiple lookup tables, the controller applying the multiple variables and data in the multiple lookup tables and calculating a charge air temperature for individual intake strokes of at least one cylinder of the engine.

18. The method of claim 17, further including calculating a delta coolant charge equal to the engine coolant temperature minus the air intake temperature.

19. The method of claim 17, further including:

entering the engine speed and the cam position into a first one of the multiple lookup tables to identify if an engine cylinder gas backflow into an intake line condition is present; and deriving a delta temperature influence from a second one of the multiple lookup tables.

* * * * *